UNITED STATES PATENT OFFICE

ALBERT S. CARTER, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF HYDRATING VINYL ACETYLENE

No Drawing.  Application filed November 11, 1930. Serial No. 495,001.

This invention relates to the preparation of an unsaturated ketone by hydration of an acetylene hydrocarbon and more particularly to the preparation of a ketone by the hydration of the triple bond of vinylacetylene.

The ketone $\Delta^3$, 2-butenone, $CH_3COCH=CH_2$ (spoken of below as methyl vinyl ketone), has been prepared by such methods as the treatment of 4-chloro-2-butenone with diethyl-aniline (Blaise and Maire, Bull. soc. chim. (4) 3, 265). This process, though chemically operable, is not practical owing to the cost of raw materials.

This invention has as an object the preparation of methyl vinyl ketone by a new and economical process from a readily obtainable raw material, vinylacetylene.

A further object of this invention is the discovery of a method of hydrolyzing the triple bond in vinylacetylene with substantially no reaction of the double bond.

These objects are accomplished by hydrating the triple bond in vinylacetylene in preference to reacting the double bond, through the agency of a suitable catalyst preferably activated by an acid medium. This reaction essentially involves the addition of water to the triple bond to form an unsaturated ketone, and is believed to take place according to the following equation:

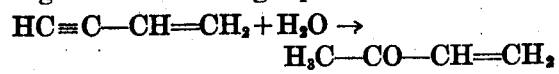

whereas simultaneous hydration of the double bond would involve such mechanism as:

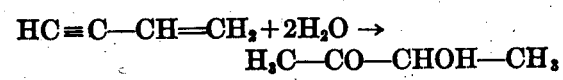

though this latter reaction has not been definitely established. Monovinylacetylene does not react with water alone, but in the presence of a suitable catalyst, hydration of the triple bond is accomplished. Using a catalyst alone, the yields are frequently very poor; for this reason I prefer the use of a catalyst in an acid medium. The addition of acid in general, appears to activate the hydration by increasing the solubility of the catalyst, by preventing its reduction to an inert form or by decreasing the tendency to form less active addition products of the catalyst and vinylacetylene.

For the purpose of this invention catalysts composed of salts, oxides or hydroxides of mercury, copper, silver, cadmium and zinc or mixtures thereof may be used; the salt being chosen so that it may be soluble in the desired aqueous medium to be used. Thus I cannot use mercuric oxide in a water system owing to its insolubility, but I may use it in a dilute sulfuric acid system whereby it forms mercuric sulfate and is soluble. The following salts are among those which have been successfully tried; mercuric sulfate, mercuric acetate, mercuric fluoborate, mercuric chloride, silver sulfate, cadmium sulfate, silver phosphate, zinc chloride and mercuric arsenate. Any concentration of catalyst may be used; in general the production is increased with an increase in the quantity of catalyst dissolved in the reaction solution. In many cases the maximum catalyst concentration is limited by its solubility.

Water soluble acids, the aqueous solutions of which are capable of dissolving appreciable quantities of the desired catalyst are, as a general class, useful for this reaction with the exception of the hydrohalogen acids (hydrochloric, hydrobromic, hydriodic and hydrofluoric acids) and preferably with the exception of all other acids or acid solutions which appreciably react with methylvinyl ketone in the following simple test which may be carried out readily by anyone skilled in the art.

*Test for adaptability of acids.*—Twenty parts of the acid solution in question is placed in a test tube and one part of methyl vinyl ketone is added. If reaction does not take place immediately, the tube is closed with a stopper and heated to 70° C. during 5 minutes. The acid is adaptable to the process if reaction does not take place as evidenced by no evolution of gas, no strong charring nor any formation of water insoluble product.

Although acids not conforming to the test may be employed, this test for adaptability is required for best results since in some cases the acid may cause a secondary reaction of the methyl vinyl ketone or vinyl acetylene; if such reaction constitutes a considerable portion of the product, the economic application of that acid is limited. For example, strong oxidizing acids can have only limited value. The following acids have been found especially valuable: sulfuric acid, acetic acid, phosphoric acid, sulfoacetic acid, arsenic acid, arsenous acid, mono-, di- and trichloroacetic acids and formic acid. The acid concentration obviously may be varied within wide limits so long as the requirements of the above test are fulfilled. I prefer the use of $H_2SO_4$ in a concentration of 30–50% (by weight) in water.

In order to disclose the process in detail, the following examples are furnished. It is, however, to be understood that the specific conditions and reagents therein disclosed are for purpose of illustration only and that it is not the intention that the invention be limited thereto.

*Example I*

A catalyst mixture is prepared by adding 10 parts of mercuric sulfate to a solution of 37 parts of sulfuric acid (sp. gr. 1.84) in 65 parts of water. This solution is chilled in ice-water to 0° C. and is then sealed in a pressure bottle with 50 parts of chilled vinylacetylene. With the temperature held below 35° C., the mixture is violently agitated for three hours, at the end of which time it is neutralized with sodium hydroxide and distilled. The distillate is a clear colorless solution of methylvinylketone in water from which the ketone may be obtained by salting out with potassium carbonate. This crude product obtained by salting may be dried and purified by fractionation under reduced pressure, collecting the ketone in that fraction which boils at 30–38° C. at 120 mm. pressure. This colorless oil, soluble in practically all solvents (e. g. water, ethanol, methanol, acetone, ether, acetic acid, etc.) forms a derivative with phenylhydrazine which is apparently 3-methyl-1-phenylpyrazoline, in a manner analogous to known methylvinylketone.

*Example II*

A catalyst solution is prepared by adding 15 parts of mercuric oxide to 50 parts of sulfuric acid and 65 parts of water. With this solution at 10–50° C., vinylacetylene is slowly bubbled through at such a rate that it is completely absorbed. When the absorption is complete the product is obtained in the manner described in Example I.

*Example III*

A catalyst solution similar to that used in Example II is heated to 60–80° C.; gaseous vinylacetylene is passed through the solution. The vapors evolved are passed through a condenser in which they are cooled to 10–20° C. removing an aqueous solution of methylvinylketone. The unreacted vinylacetylene together with fresh vinylacetylene is returned through the catalyst by means of a suitable circulating pump. During this process, the water removed by vaporization and reaction should be replaced in the catalyst. The aqueous solution of the product can be purified by salting out the oil with potassium carbonate and vacuum distillation as described in Example I.

In the above examples the use of mercuric oxide and mercuric sulfate as the catalyst is disclosed. It should be understood that the salts and oxides of other metals may be substituted. Thus I have found that the salts and oxides of silver, cadmium, copper and zinc may be employed with success.

It is to be understood that the concentration of catalyst which may be used may vary over a wide range, limited only by the solubility of the salt as a maximum and as low as a small fraction of a percent as a minimum. The concentrations given in the examples are chosen because of convenience in operation.

As will appear from the examples, several methods may be used in carrying out the reaction. First, liquid vinylacetylene cooled below its boiling point may be added to the aqueous acid-catalyst mixture cooled to the same temperature; the system is then closed and the mixture agitated, cooling if necessary, to control the violence of the reaction. At the end of a few hours, when reaction is complete, the product is removed by distillation. Second, the reaction may be carried out by bubbling vinylacetylene into the aqueous catalyst mixture at such a rate that it is completely absorbed. Further, it may be made continuously by introducing vinylacetylene into the aqueous catalyst at such a temperature that the ketone is continuously distilled from the solution with the escaping vinylacetylene, water being added to replace that which is removed and if desired, vinylacetylene being recirculated to the catalyst. In the batch process, the product may also be worked up by neutralizing the acid with an alkaline substance such as sodium carbonate, sodium hydroxide or lime before the distillation of the product; this decreases the losses due to polymerization and decomposition. The reaction may be carried out over a wide range of temperature below the boiling point of the catalyst solution. The range included between 0° and 90° C. is preferred, though with the method of operation involving the passage of gaseous vinylacetylene through the catalyst solution, substantially higher temperatures are successful. The process may also be operated under pressure up to several atmospheres, in this manner obtaining the effect of increased catalyst and acid concentration and increased temperatures. Example I discloses a system whereby slightly increased pressures are advantageously applied, by simply allowing the vapor pressure of the vinylacetylene to rise to from one to three atmospheres.

The properties of the product, methylvinylketone, are as follows:

a. Boiling point 30–38° C. at 120 mm. pressure.

Boiling point 62–68° C. at 400 mm. pressure.

When distilled at 760 mm., there is considerable polymerization and the boiling point appears to be approximately 82–87° C.

b. The product is soluble in most pure solvents, e. g., water, ethanol, methanol, acetone, ether, acetic acid, ethylacetate, etc.

c. The product possesses a penetrating odor, producing coughing and irritating the throat. In a similar manner, it is a lachrymator.

d. Upon standing, the product slowly polymerizes to a viscous oil, then to a tough transparent solid. This polymerization is accelerated by heat; polymerization of a similar type results upon treatment with strong alkalies with and without heating.

As many apparent and widely different embodiments of this invention may be made without departing from the spirit thereof, it is to be understood that I do not limit myself to the foregoing examples or descriptions except as indicated in the following claims:

I claim:

1. The method of preparing methylvinylketone which comprises hydrating vinylacetylene under conditions adapted to hydrolyze only the triple bond.

2. The method of preparing methylvinylketone which comprises reacting vinylacetylene with water in the presence of a hydrating catalyst which is soluble in the aqueous medium employed.

3. The method of preparing methylvinylketone which comprises reacting vinylacetylene with water in the presence of a compound of the group consisting of mercuric sulfate, mercuric acetate, mercuric fluoborate, mercuric chloride, silver sulfate, cadmium sulfate, silver phosphate, zinc chloride and mercuric arsenate.

4. The method of preparing methylvinylketone which comprises hydrating vinylacetylene in the presence of an aqueous solution of a catalyst of the group consisting of the salts, oxides and hydroxides of mercury, copper, silver, cadmium and zinc and a non-hydrohalogen acid adapted in aqueous solution to act as a solvent for said catalyst.

5. The method of preparing methylvinylketone which comprises hydrating vinylacetylene in the presence of an aqueous solution of an acid, which solution will not substantially react with methylvinylketone when heated therewith during five minutes to 70° C., and a catalyst of the group consisting of the salts, oxides and hydroxides of mercury, copper, silver, cadmium, and zinc, which catalyst is soluble in said aqueous acid solution.

6. The method of preparing methylvinylketone which comprises hydrating vinylacetylene in the presence of an aqueous solution of an acid of the group consisting of sulfuric, acetic, phosphoric, sulfoacetic, arsenic, mono-, di-, and trichloracetic and formic acids and a catalyst of the group consisting of mercuric sulfate, mercuric acetate, mercuric fluoborate, mercuric chloride, silver sulfate, cadmium sulfate, silver phosphate, zinc chloride and mercuric arsenate, and mixtures thereof.

7. The process of claim 6 wherein a 30 to 50% solution of sulfuric acid is employed.

8. The process of claim 6 wherein the aqueous medium is a 30 to 50% solution of sulfuric acid and the catalyst a mercury compound.

9. The process of claim 6 wherein the aqueous medium is a 30 to 50% solution of sulfuric acid and the catalyst mercuric sulfate.

10. The process of claim 6 wherein the vinylacetylene is passed into the acid medium in gaseous form, the resulting mixture is neutralized and the ketone separated therefrom by distillation.

11. The process of claim 6 wherein the aqueous solution is heated to 60–80° C., the vinylacetylene is introduced in gaseous form into the heated solution and the unreacted vinylacetylene and water is separated from the ketone contained in the evolved vapors and returned to the acid medium, together with water and vinylacetylene equivalent to that removed by the reaction.

12. The method of preparing methylvinylketone which comprises reacting vinyl acetylene with water under conditions adapted to hydrolyze the triple bond only.

13. The method of preparing methylvinylketone which comprises reacting vinyl acetylene and an aqueous solution of a mercury compound and an acid adapted to dissolve said compound, which acid is substantially inert toward methylvinylketone.

In testimony whereof, I affix my signature.

ALBERT S. CARTER.